United States Patent [19]

Stampfli

[11] 4,082,116
[45] Apr. 4, 1978

[54] ELECTROMAGNETIC TWO-WAY VALVE

[75] Inventor: Harald Stampfli, Petit-Saconnex, Switzerland

[73] Assignee: Lucifer S.A., Carouge, Switzerland

[21] Appl. No.: 696,863

[22] Filed: Jun. 16, 1976

[30] Foreign Application Priority Data

Jun. 27, 1975 Switzerland .................. 8354/75

[51] Int. Cl. .................................................. F16k 31/06
[52] U.S. Cl. .................................. 137/630.14; 251/30; 251/45
[58] Field of Search .............. 251/30, 129, 141, 45, 251/46; 137/630.14

[56] References Cited

U.S. PATENT DOCUMENTS

| 2,502,256 | 3/1950 | Harding, Jr. ............... 137/630.14 |
| 2,651,744 | 9/1953 | Acklin et al. .................... 251/129 |
| 2,990,155 | 6/1961 | Selinder ............................ 251/30 |
| 3,076,630 | 2/1963 | Hammond ......................... 251/30 |
| 3,082,359 | 3/1963 | Mangiafico et al. ............. 251/141 |
| 3,114,532 | 12/1963 | Gray et al. ....................... 251/30 |
| 3,154,285 | 10/1964 | Houle .............................. 251/30 |
| 3,362,679 | 1/1968 | LeWan ............................ 251/45 |
| 3,424,951 | 1/1969 | Barker ............................ 251/129 |
| 3,549,119 | 12/1970 | Sellers ............................ 251/129 |
| 3,994,318 | 11/1976 | Ishigaki .......................... 251/30 |

FOREIGN PATENT DOCUMENTS 395,672   12/1965   Sweden .................................. 251/30

Primary Examiner—Martin P. Schwadron
Assistant Examiner—G. L. Walton
Attorney, Agent, or Firm—Emory L. Groff, Jr.

[57] ABSTRACT

A two-way valve has a valve clack cooperating with a seat and mounted with play in a mobile core of an electromagnetic actuator to provide fluid-assisted opening of the valve. The mobile core moves in a chamber connected to the fluid inlet by a restricted annular passage disposed about the core. Movement of the mobile core towards the open position produces an increase in the cross-sectional area of the restricted passage, so that the fluid assistance is initially great, but then decreases.

7 Claims, 6 Drawing Figures

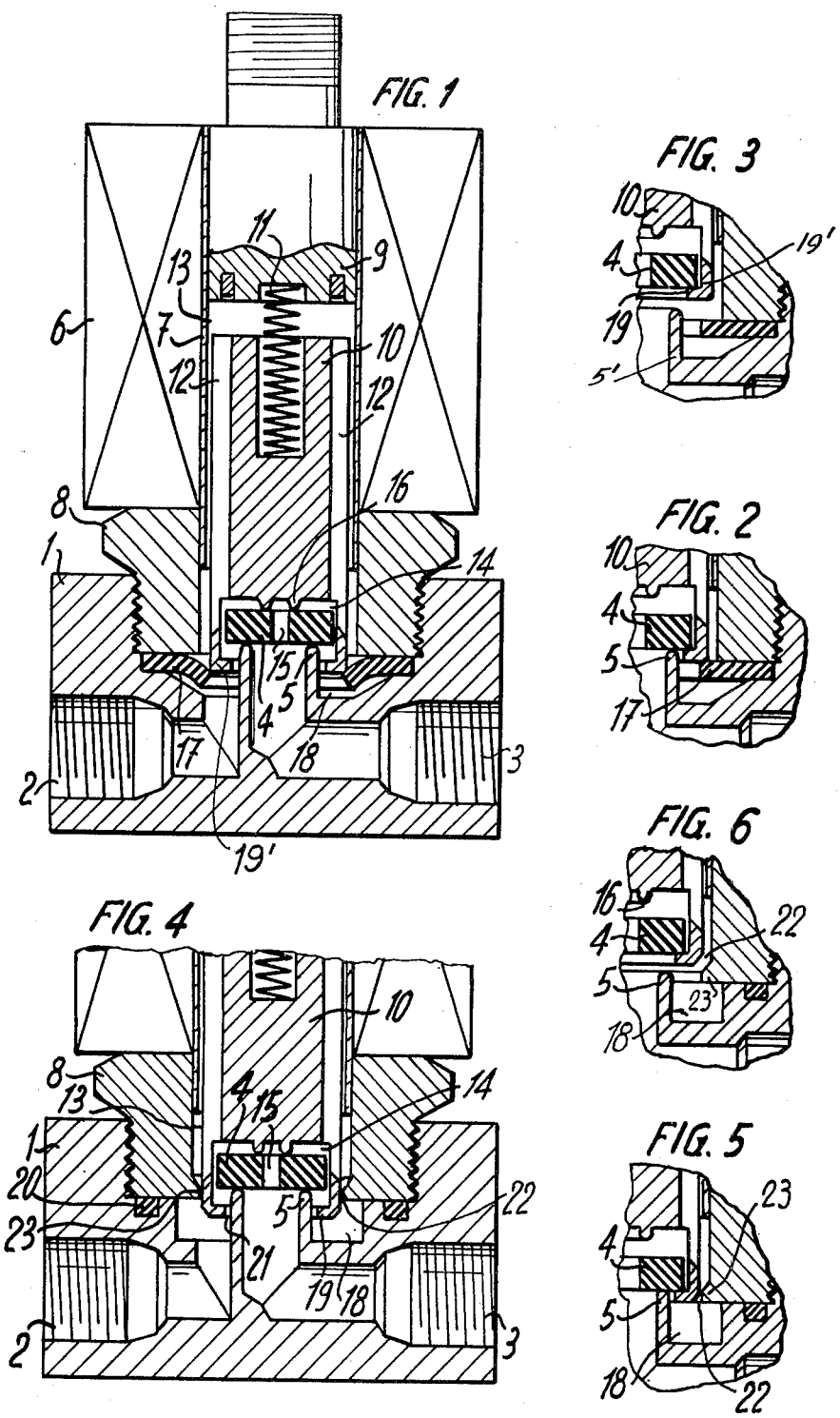

ELECTROMAGNETIC TWO-WAY VALVE

The invention relates to electromagnetic two-way valves.

A known electromagnetic two-way valve comprises a body, a clack carried with axial play by a mobile portion of, and a magnetic core movable under the effect of a magnetic field produced by an electrical winding to control movement of the mobile piece. The clack cooperates with a seat disposed between an inlet and an outlet for fluid to be controlled, and the mobile portion is movable in a chamber connected to the inlet by a restricted passage. The clack has a hole situated facing the passage of the seat, and the mobile portion has, in cross-section, a greater area than the passage of the seat. The mobile portion also has a portion which closes the hole of the clack in the closed position of the valve. A separation between the inlet and said chamber is formed by a portion of the mobile portion exposed to the pressure in the inlet so that the fluid exerts on the mobile portion a thrust to assist its movement in the direction of opening of the clack as soon as the mobile portion is removed from the hole of the clack. A valve of this type is, for example, described in Swiss Pat. No. 395,672.

It is of course advantageous that the pressure of the fluid to be controlled produces a force assisting opening of the valve. To the contrary, during the closing of the valve, this force opposes movement of the clack to its closed position, which considerably increases the time required to close the valve.

An aim of the invention is to remedy this disadvantage by providing an arrangement which produces a relatively great assistance by fluid pressure during a first part of the opening movement, and a weak assistance in a second part. Conversely, during closing of the valve, the assistance means only produce a low resistance during the first part of the closing movement, which enables rapid closure. During the second part of the closing movement, the resistance of the assistance means becomes greater, but this does not delay closing by a great amount since, on the one hand, the clack may already be in the closed position and, on the other hand, the moving parts are already in motion. This resistance of the assistance means serves to damp movement of the parts still in motion at the end of closing of the valve.

To this end, according to the invention, in a valve of the aforesaid type the restricted passage comprises an annular passage the inner circumference of which is defined by the mobile piece, and the valve is arranged so that movement of the mobile piece towards the open position of the valve produces an increase of the cross-sectional area of the restricted passage.

The accompanying drawings show, schematically and by way of example, two embodiments of valve according to the invention. In the drawings:

FIG. 1 is an axial cross-section of a first embodiment;

FIGS. 2 and 3 show a part of FIG. 1 in two different positions of operation;

FIG. 4 is an axial cross-section of a second embodiment; and

FIGS. 5 and 6 show a part of FIG. 4 in two different positions of operation.

The two-way valve shown in FIGS. 1 to 3 comprises a body 1 with an inlet 2 and an outlet 3. The flow of fluid between this inlet and outlet is controlled by a clack 4 bearing on an annular seat 5 at the upper end of an axially extending valve seat portion having a central opening leading to outlet 3.

The electromagnetic part of the valve comprises a winding 6 mounted on a tube 7 of non-magnetic material fixed in a piece 8 screwed in body 1. In the tube 7 are a fixed magnetic core 9 and a mobile magnetic core 10 carrying the clack 4 and submitted to the action of a spring 11 biasing it to apply the clack 4 against seat 5.

The mobile core 10 has two longitudinal grooves 12 to facilitate its movement in the fluid filling a chamber 13 in tube 7. These grooves 12 communicate with a housing 14 provided in a mobile portion at the lower end of the mobile core 10 and in which the clack 4 is floatably mounted. The clack 4 has a central bleeder hole 15, and the top face of housing 14 in the mobile portion of the core 10 has an annular rib 16 seat portion which is able to bear against the clack 4 to obturate the hole 15. The diameter of rib 16 less than that of the circular seat 5.

Finally, an annular membrane 17 is gripped by its outer edge between the piece 8 and body 1. The inner edge of membrane 17 is free and, in the closed position of the valve, bears against the lower end of the mobile portion of core 10 so that the membrane 17 obturates the direct passage between the chamber 13 and a chamber 18 situated under membrane 17 and communicating with the inlet 2.

Operation of this valve is as follows:

In the closed position shown in FIG. 1, the clack 4 is applied against seat 5 under the action of spring 11 and the pressure of fluid in chamber 13. In the absence of a flow of the fluid, the pressure in chamber 13 is equal to that in the supply pipe connected to inlet 2. In effect, in this position, the chamber 18 communicates with chamber 14 by the clearance about seat 5 and clack 4, which allows the inlet pressure to be transmitted into chamber 13. The force exerted by the fluid on clack 4 is thus equal to the difference of the pressure of the fluid between the inlet 2 and outlet 3 multiplied by the area of seat 5.

During the energization of winding 6 to open the valve, the core 10 is attracted by the fixed core 9 and thus moves up against the relatively weak biasing force of spring 11. During the first part of this movement, the rib 16 moves away from the clack 4 and uncovers its central hole 15. Because of the relatively small diameter of the rib 16, the force required to overcome the static pressure exerted by the fluid is not great.

Following the opening of hole 15, the chamber 13 is connected to the outlet 3, which is at a low pressure, and the pressure in chamber 13 drops rapidly, since the cross-sectional area of the hole 15 is considerably greater than the cross-sectional area of the fluid-passage between the chamber 18 and chamber 13. At the beginning of movement, the smallest section of this passage is determined either by the clearance between the outer wall of the seat 5 and the lower opening of housing 14, or by the clearance between the periphery of clack 4 and the lateral wall of housing 14.

It should be remarked that at the beginning of movement, the pressure exerted by the fluid against the lower face of the membrane 17 exerts an upwardly-directed pressure on the membrane 17 which assists movement of the mobile core 10, until the core 10 and membrane 17 reach the positions shown in FIG. 2.

In the second part of the upwards movement of mobile core 10, the clack 4 is lifted from the seat 5 by an annular flange 19 at the lower end of a flange portion 19' of the core 10. The force required to lift the clack 4 is relatively weak, because at the moment when the clack 4 must be removed from seat 5, the difference of pressure between the chamber 13 and outlet 3 is relatively small. Moreover, at the moment of removal of the clack 4 from seat 5, communication between the chambers 13 and 18 is interrupted by contact of the flange 19 with clack 4, and the pressure in chamber 18 acts on all of the annular surface of the mobile parts external to the seat 5 (see FIG. 2).

As soon as the clack 4 has been lifted up from the seat 5 (FIG. 3), the lower end of core 10 moves out of contact with the membrane 17 so that chamber 18 communicates with chamber 13 by an annular passage defined between the outer wall of core 10 and the inner surface of piece 8. Moreover, the chamber 18 communicates with outlet 3, thus producing a decrease of the passage in this chamber. Consequently, during the final part of the opening movement, the fluid-assistance is relatively weak.

When energization of the winding 6 is cut off, the biasing spring 11 pushes the core 10 down, and the valve reassumes its closed position illustrated in FIG. 1.

FIG. 4 illustrates a second embodiment which is similar to the first and the same parts are designated by the same reference numerals. However, in the second embodiment the membrane 17 is dispensed with and fluid-tightness between the body 1 and piece 8 is provided by an annular joint 20. Communication between the fluid inlet 2 and chamber 13 is made by two annular passages 21 and 22. The passage 22 is formed by the clearance between the lower end of core 10 and an inwardly-protruding annular rib 23 on piece 8. The cross-sectional area of this annular passage 22 varies as a function of the position of the mobile core 10; it increases as soon as the lower end of the core 10 has passed above rib 23.

The other passage 21 is formed, as in the first embodiment, by the clearance between the outer wall of seat 5 and the flange 19 of core 10.

Operation of the second embodiment of valve is similar to that of the first embodiment. From the beginning of lifting up of the core 10, the central hole 15 of the clack 4 is opened, which makes the pressure in chamber 13 drop by connecting it to the exhaust outlet 3.

At an intermediary point of its movement, at the beginning of the removal of clapper 4 from its seat 5, the core 10 occupies the position shown in FIG. 5; this takes place just before the core 10 passes by the rib 23, when the section of the passage between the chambers 13 and 18 has its lesser value.

The pressure in chamber 18 still exerts a slight thrust, since it applies on the annular area of the mobile core 10 surrounding the seat 5. This pressure is however less than that exerted on the membrane 17 which, as shown in FIG. 1, obturates the passage 22. FIG. 6 shows the open position of the valve.

I claim:

1. An electromagnetic two-way valve comprising a body, a magnetic core movable under the effect of a magnetic field produced by an electrical winding, a mobile portion movable with said core, a generally disc shaped clack carried by said mobile portion and movable axially with respect thereto, an axially extending valve seat portion provided with a valve seat defining an outlet passage formed in said body in a position to be engaged by said clack, a bleeder hole centrally disposed in said clack, said mobile portion having a flange portion extending closely adjacent said seat portion to form a restricted inlet passageway from a main inlet to a lower face of the clock, said clack having an outer circumference substantially greater than that of the seat and disposed in a position to engage said flange portion upon upward movement thereof, said mobile portion having an annular rib seat portion engageable with said opposite face of the clack in a position to close the bleeder hole, whereby upon initial upward movement of said core and mobile portion, the bleeder hole in the clack is first uncovered permitting a reduction of pressure in the space thereabove, and upon further upward movement, the clack is engaged by the flange portion to close said restricted passageway, at which point the inlet pressure of the incoming fluid will give an upward impulse to the clack and the mobile portion to aid the electromagnetic force in lifting the clack from its seat.

2. A valve according to claim 1 in which the restricted inlet passageway becomes an increased size passageway upon further upward movement after lifting up of the clack by the mobile portion to a position where the flange portion is above the seat portion.

3. A valve according to claim 2, in which the mobile portion is formed integrally with the magnetic core.

4. A valve according to claim 3, in which an annular rib fixed in relation to the valve body is slightly spaced from the outer portion of the mobile portion when in its lower position, providing a second restricted passageway.

5. A valve according to claim 3, in which an annular elastic membrane is mounted on said body in a position to engage the outer edge of the flange portion in its lower position.

6. A valve according to claim 4, in which the mobile portion carries an annular rib seat portion which cooperates with the clack about said hole to obturate it in the closed position of the valve, the diameter of said annular rib being smaller than that of the seat against which the clack bears to obturate the passage communicating with the fluid outlet.

7. A valve according to claim 5, in which the mobile portion carries an annular rib seat portion which cooperates with the clack about said bleeder hole to obturate it in the closed position of the valve, the diameter of said annular rib being smaller than that of the seat against which the clack bears to obturate the passage communicating with the fluid outlet.

* * * * *